United States Patent
Mizuno (10) Patent No.: US 9,260,130 B2
(45) Date of Patent: Feb. 16, 2016

(54) VEHICLE STEERING APPARATUS

(71) Applicant: AISIN SEIKI KABUSHIKI KAISHA, Kariya-shi (JP)

(72) Inventor: Taichi Mizuno, Anjo (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 10 days.

(21) Appl. No.: 14/248,969

(22) Filed: Apr. 9, 2014

(65) Prior Publication Data

US 2014/0305252 A1  Oct. 16, 2014

(30) Foreign Application Priority Data

Apr. 10, 2013  (JP) .................................. 2013-082435

(51) Int. Cl.
  *B62D 1/18* (2006.01)
  *B62D 1/181* (2006.01)
  *B62D 1/187* (2006.01)

(52) U.S. Cl.
  CPC ............... *B62D 1/181* (2013.01); *B62D 1/187* (2013.01)

(58) Field of Classification Search
  CPC .............................. B62D 1/181; B62D 1/187
  USPC .................................... 280/775; 74/493–496
  See application file for complete search history.

(56) References Cited

U.S. PATENT DOCUMENTS

| 5,178,411 A * | 1/1993 | Fevre et al. ................... 280/775 |
| 6,711,965 B2 * | 3/2004 | Tomaru et al. .................. 74/493 |
| 7,159,904 B2 | 1/2007 | Schäfer et al. |
| 7,886,630 B2 * | 2/2011 | Tomaru et al. .................. 74/493 |
| 2004/0041388 A1 * | 3/2004 | Muller .......................... 280/777 |
| 2006/0175821 A1 * | 8/2006 | Min ............................. 280/775 |
| 2013/0098193 A1 * | 4/2013 | Morinaga et al. ............... 74/493 |
| 2013/0160597 A1 * | 6/2013 | Masuda et al. ................. 74/493 |

FOREIGN PATENT DOCUMENTS

EP  1 583 680 B1  10/2005

* cited by examiner

*Primary Examiner* — James English
(74) *Attorney, Agent, or Firm* — Buchanan Ingersoll & Rooney PC (57) ABSTRACT

A vehicle steering apparatus includes: a telescopic mechanism that can move a steering column in a front and rear direction of a vehicle; a tilt mechanism that can tilt the steering column in a vertical direction of the vehicle; a driving mechanism that adjusts and transmits an output torque of a driving motor to a telescopic screw shaft that drives the telescopic mechanism and to a tilt screw shaft that drives the tilt mechanism provided in parallel with the telescopic screw shaft; and a switching mechanism that has a first clutch mechanism which connects and disconnects the driving mechanism and the tilt screw shaft, a second clutch mechanism which connects and disconnects the driving mechanism and the telescopic screw shaft, and a switching motor that switches a clutch mechanism between the first clutch mechanism and the second clutch mechanism.

4 Claims, 8 Drawing Sheets

VEHICLE STEERING APPARATUS

CROSS REFERENCE TO RELATED APPLICATIONS

This application is based on and claims priority under 35 U.S.C. §119 to Japanese Patent Application 2013-082435, filed on Apr. 10, 2013, the entire contents of which are incorporated herein by reference.

TECHNICAL FIELD

This disclosure relates to a vehicle steering apparatus, particularly, a vehicle steering apparatus that can adjust an operation position of a steering wheel by selectively connecting a single driving motor to either a telescopic mechanism or a tilt mechanism.

BACKGROUND DISCUSSION

For example, EP 1583680B1 (Reference 1) discloses a steering apparatus that realizes adjustment of both tilt operation and telescopic operation with a single motor by switching power of the single motor to either the tilt operation or the telescopic operation using a power switching mechanism. In Reference 1, the motor outputs a driving force via a speed reducer to rotate a spindle (a male screw), and two nuts (female screws) meshing with the spindle at all times are disposed and respectively connected to a tilt link and a telescopic link. Since each nut includes a lock mechanism, and when the lock mechanism is locked, the nut is restrained from rotating with respect to the spindle, the nut moves in an axial direction of the spindle when the spindle rotates. That is, when the tilt mechanism-side nut moves, the tilt operation is performed, and when the telescopic mechanism-side nut moves, the telescopic operation is performed. When the lock mechanism is unlocked, the nut idles with respect to the rotation of the spindle and thus, the tilt operation or the telescopic operation is not performed. The following is examples of the lock mechanism: engagement and disengagement of a lock pin by a solenoid, an electromagnetic brake, an eddy current brake and the like.

In the steering apparatus disclosed in EP 1583680B1 (Reference 1), since each of the tilt mechanism-side nut and the telescopic mechanism-side nut needs the lock mechanism, one motor can be used with certainty whereas any reduction effects in the number of components, costs and mass cannot be expected. Since the tilt mechanism-side nut and the telescopic mechanism-side nut are disposed in series with each other, a total length of a steering column becomes great and mountability deteriorates.

SUMMARY

Thus, a need exists for a steering apparatus which is not suspectable to the drawback mentioned above.

An aspect of this disclosure is directed to a vehicle steering apparatus including: a telescopic mechanism that can move a steering column in a front and rear direction of a vehicle; a tilt mechanism that can tilt the steering column in a vertical direction of the vehicle; driving mechanism that adjusts and transmits an output torque of a driving motor to a telescopic screw shaft that drives the telescopic mechanism and to a tilt screw shaft that drives the tilt mechanism provided in parallel with the telescopic screw shaft; and a switching mechanism that has a first clutch mechanism which connects and disconnects the driving mechanism and the tilt screw shaft, a second clutch mechanism which connects and disconnects the driving mechanism and the telescopic screw shaft, and a switching motor that switches a clutch mechanism between the first clutch mechanism and the second clutch mechanism, wherein the first clutch mechanism and the second clutch mechanism of the switching mechanism has a first clutch member and a second clutch member, respectively, which mutually move in an axial direction and transmit a rotational force when either the tilt screw shaft or the telescopic screw shaft is connected to the driving mechanism, and when the switching motor moves one of the first clutch member and the second clutch member in a predetermined direction, one of the first clutch mechanism and the second clutch mechanism is put in a connection state, the other of the first clutch member and the second clutch member moves in a direction opposite to the predetermined direction, and the other of the first clutch mechanism and the second clutch mechanism is put in a disconnection state.

The configuration disclosed here provides the following effects. That is, the steering apparatus disclosed here includes the driving mechanism that adjusts and transmits an output torque of the driving motor to the telescopic screw shaft which drives the telescopic mechanism and to the tilt screw shaft which drives the tilt mechanism provided in parallel with the telescopic screw shaft; and the switching mechanism that has the first clutch mechanism which connects and disconnects the driving mechanism and the tilt screw shaft, the second clutch mechanism which connects and disconnects the driving mechanism and the telescopic screw shaft, and a switching motor that puts one of the first clutch mechanism and the second clutch mechanism in a connection state and the other in a disconnection state. It is possible to easily and reliably put one of the first clutch mechanism and the second clutch mechanism in the connection state and the other in the disconnection state. It is possible to selectively connect the single driving motor to either the telescopic mechanism or the tilt mechanism. Since the telescopic screw shaft and the tilt screw shaft are provided in parallel with each other, it is possible to configure the entire apparatus in a compact size.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
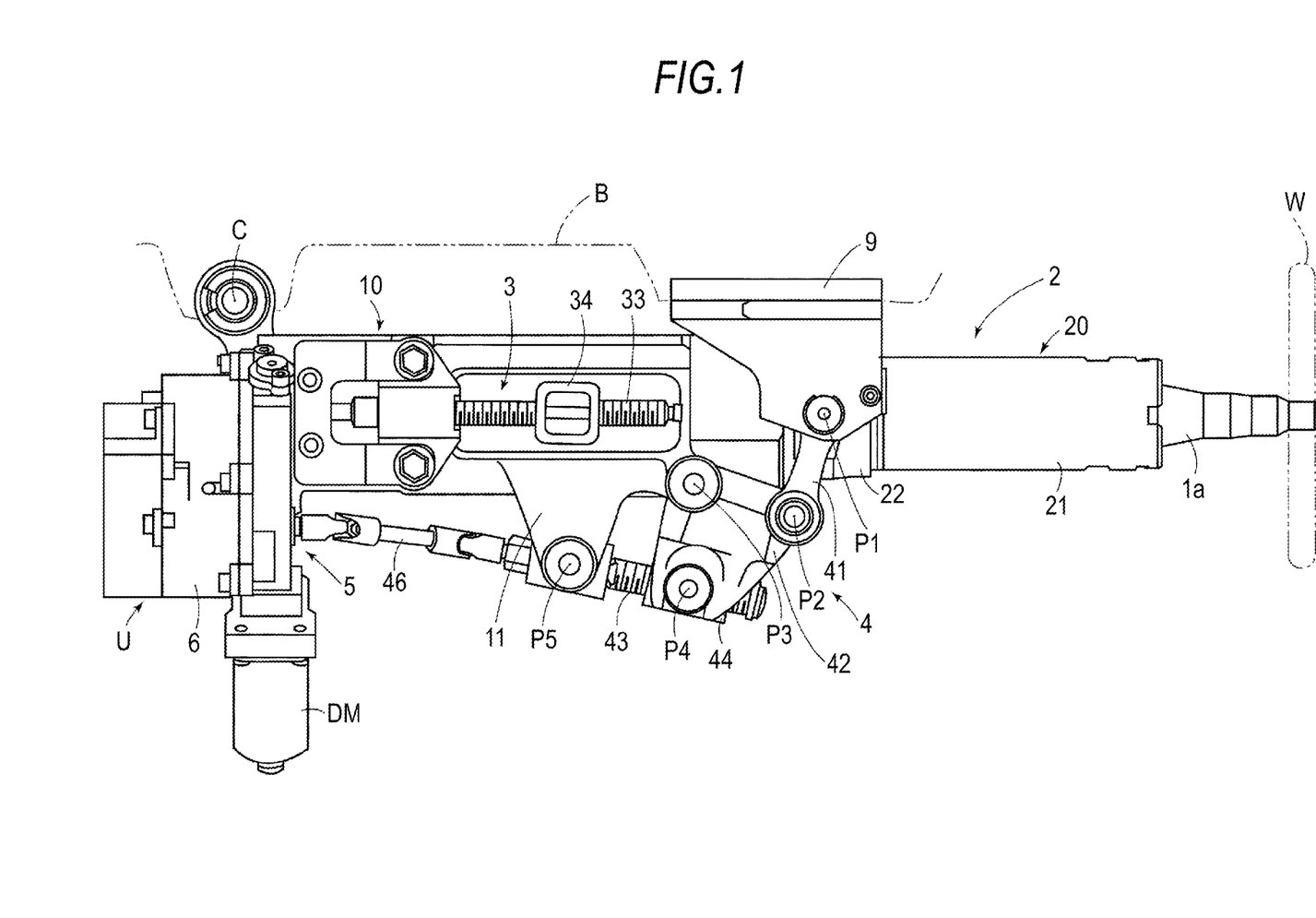
FIG. 1 is a side view of a steering apparatus according to an embodiment disclosed here.
Figure 2:
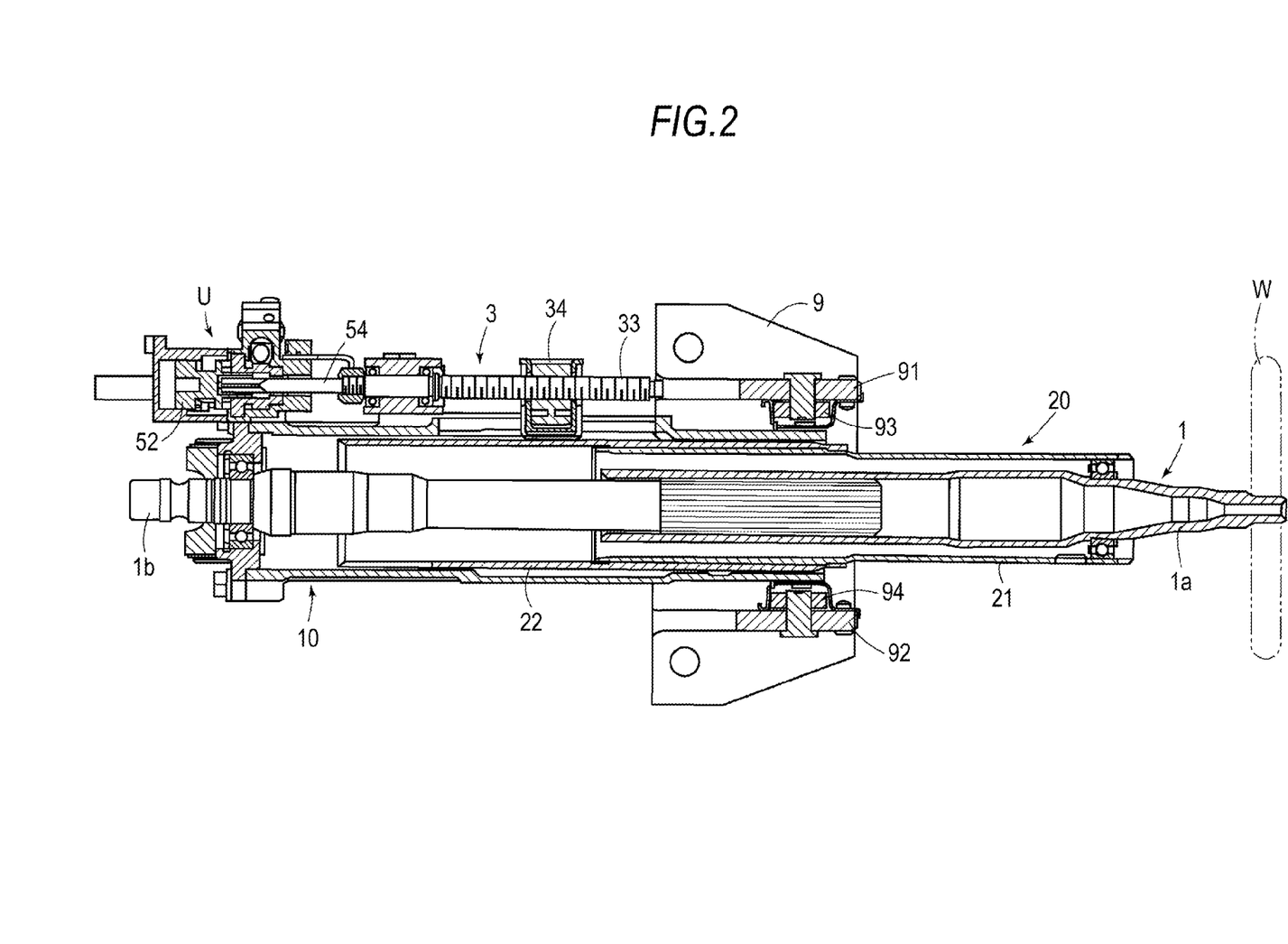
FIG. 2 is a horizontal cross-sectional view of the steering apparatus according to the embodiment disclosed here.

Hereinafter, a preferred embodiment disclosed here will be described with reference to the accompanying drawings. FIGS. 1 and 2 illustrate an overall configuration of a steering apparatus according to an embodiment disclosed here. The steering apparatus has a following configuration in which a steering column 2 is supported to be movable in a front and rear direction and tiltable with respect to a vehicle body B, a single driving motor DM is selectively connected to either a telescopic mechanism 3 or a tilt mechanism 4 by a driving switching unit U disposed in a front of a vehicle, and an operation position of a steering wheel W is adjusted based on an operation of the telescopic mechanism 3 or the tilt mechanism 4. A steering shaft 1 is configured to have a cylindrical upper shaft 1a that has the steering wheel W connected to a rear end portion thereof, and a lower shaft 1b spline-coupled with a front end portion of the upper shaft 1a. As illustrated in FIG. 2, the upper shaft 1a and the lower shaft 1b are connected in such a manner that the upper shaft 1a and the lower shaft 1b can move relative to each other in an axial direction, and a front end portion of the lower shaft 1b is connected to a wheel turning mechanism (not illustrated). The wheel turning mechanism is configured in such a manner that the wheel turning mechanism is driven based on an operation of the steering wheel W to turn wheels (not illustrated) via a wheel steering mechanism (not illustrated).

A main housing 10 is disposed coaxially with the steering shaft 1. The main housing 10 is supported to be tiltable about a tilt center C with respect to the vehicle body B, and is retained by a fixation bracket 9. The fixation bracket 9 has a pair of retention portions 91 and 92 that extend toward a bottom of the vehicle and face each other, the main housing 10 is retained between the pair of retention portions 91 and 92, and the fixation bracket 9 is fixed to the vehicle body B at a top in FIG. 1. Furthermore, as illustrated in FIG. 2, pressing mechanisms 93 and 94 are respectively installed between each of the pair of retention portions 91 and 92 of the fixation bracket 9 and the main housing 10 and thus, the main housing 10 is supported in a pressed manner to be slidable.

A movable column member 20 is supported in the main housing 10 in such a manner that the movable column member 20 is movable in the axial direction, that is, is movable in the front and rear direction of the vehicle body. The movable column member 20 is configured to have an inner tube 21 that accommodates the steering shaft 1 and supports the steering shaft 1 to be rotatable about an axis thereof, and an outer tube 22 that accommodates the inner tube 21 to retain the inner tube 21 at a predetermined position at all times. The inner tube 21 is also referred to as an upper tube, and the outer tube 22 is also referred to as a telescopic tube. The upper shaft 1a is rotatably supported in a rear end portion of the inner tube 21 via a bearing (a symbol of the bearing is omitted), but the upper shaft 1a and the inner tube 21 are configured in such a manner that the upper shaft 1a and the inner tube 21 are restrained from moving in the axial direction relative to each other, and can move in an integral manner in the axial direction. A telescopic screw shaft 33 configured to have a trapezoidal screw (a male screw) is supported by the main housing 10 via a bearing (a symbol of the bearing is omitted). A nut member 34 is screwed on the telescopic screw shaft 33 to be movable in an axial direction, and is fixed to the outer tube 22. The nut member 34 moves in the axial direction as the telescopic screw shaft 33 rotates about an axis thereof, and the outer tube 22 moves in the front and rear direction of the vehicle.

The telescopic mechanism 3 is configured in such a manner that the outer tube 22, the inner tube 21, the steering shaft 1 and the steering wheel W can move in an integral manner in the axial direction with respect to the main housing 10. Accordingly, it is possible to adjust the steering wheel W to a desired position in the front and rear direction of the vehicle. Furthermore, when a load equal to or greater than a predetermined value is applied to the steering shaft 1, the inner tube 21 is configured in such a manner that axial movement (consequently, axial movement of the upper shaft 1a) of the inner tube 21 relative to the outer tube 22 is allowed. The inner tube 21 and the outer tube 22 of the embodiment function as an energy absorption mechanism together with an annular frictional material (for example, a elastic metal tube) installed therebetween.

In contrast, as illustrated in FIG. 1, an upper end portion of a link member 41 is supported by the fixation bracket 9 to be rotatable about a pivot shaft P1, and a lower end portion of the link member 41 is supported by a link member 42 to be rotatable about a pivot shaft P2. The link member 42 is supported to be rotatable about a pivot shaft P3 by a bottom of the main housing 10. Furthermore, a nut member 44 is supported by the link member 42 to be rotatable about a pivot shaft P4. The nut member 44 is screwed on a tilt screw shaft 43 configured to have a trapezoidal screw (a male screw), and is also referred to as a tilt nut or a tilt slider. The tilt screw shaft 43 is supported by a supporting member 11 fixed to the main housing 10 in such a manner that the tilt screw shaft 43 is rotatable about a pivot shaft P5.

The tilt mechanism 4 is configured as follows: when the nut member 44 moves in an axial direction of the tilt screw shaft 43 based on a rotational (a rotation about an axis of the tilt screw shaft 43) driving of the tilt screw shaft 43, the link member 42 tilts about a pivot shaft P3, the link member 41 tilts about the pivot shaft P1, and the main housing 10 (in addition, the outer tube 22, the inner tube 21, the upper shaft 1a and the steering wheel W) moves in a vertical direction of the vehicle.

Figure 3:
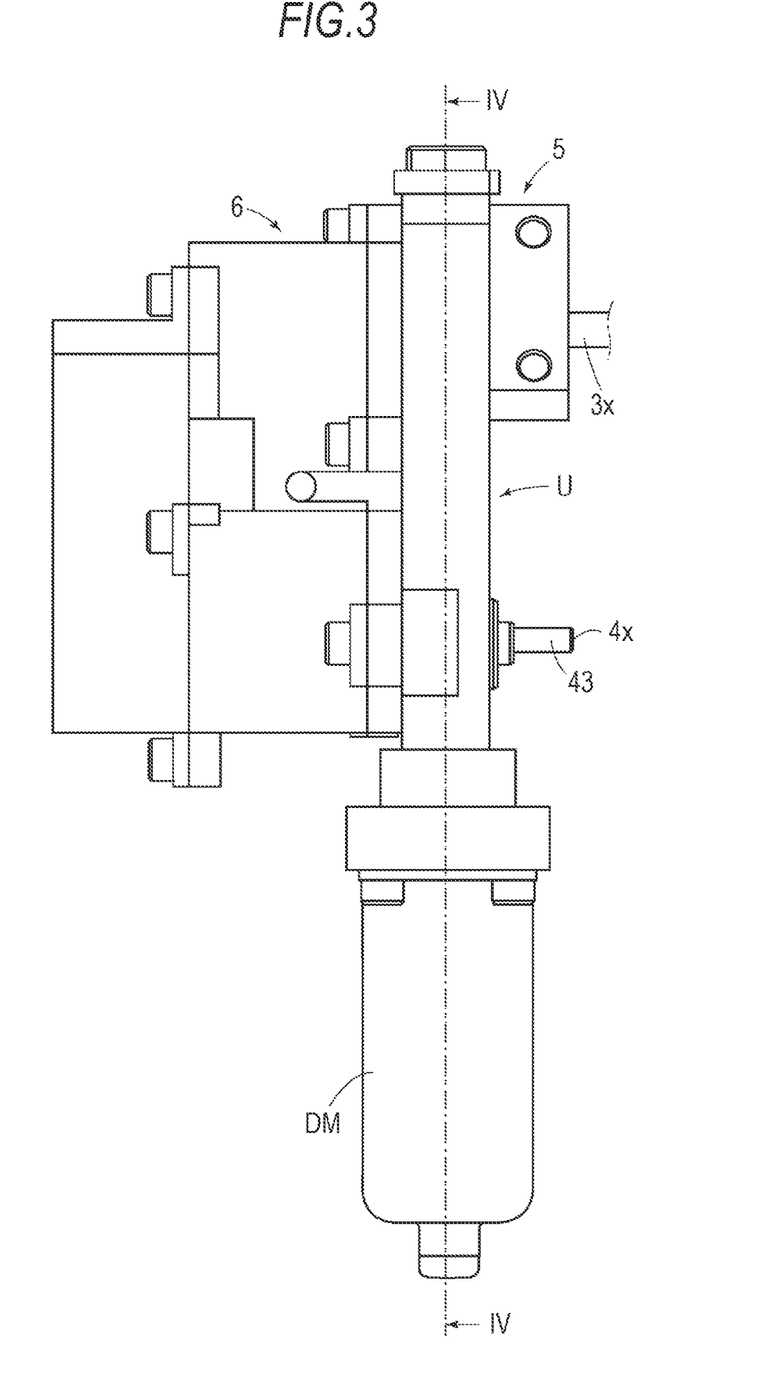
FIG. 3 is a side view illustrating enlarged driving mechanism and switching mechanism portions in the embodiment disclosed here.
Figure 4:
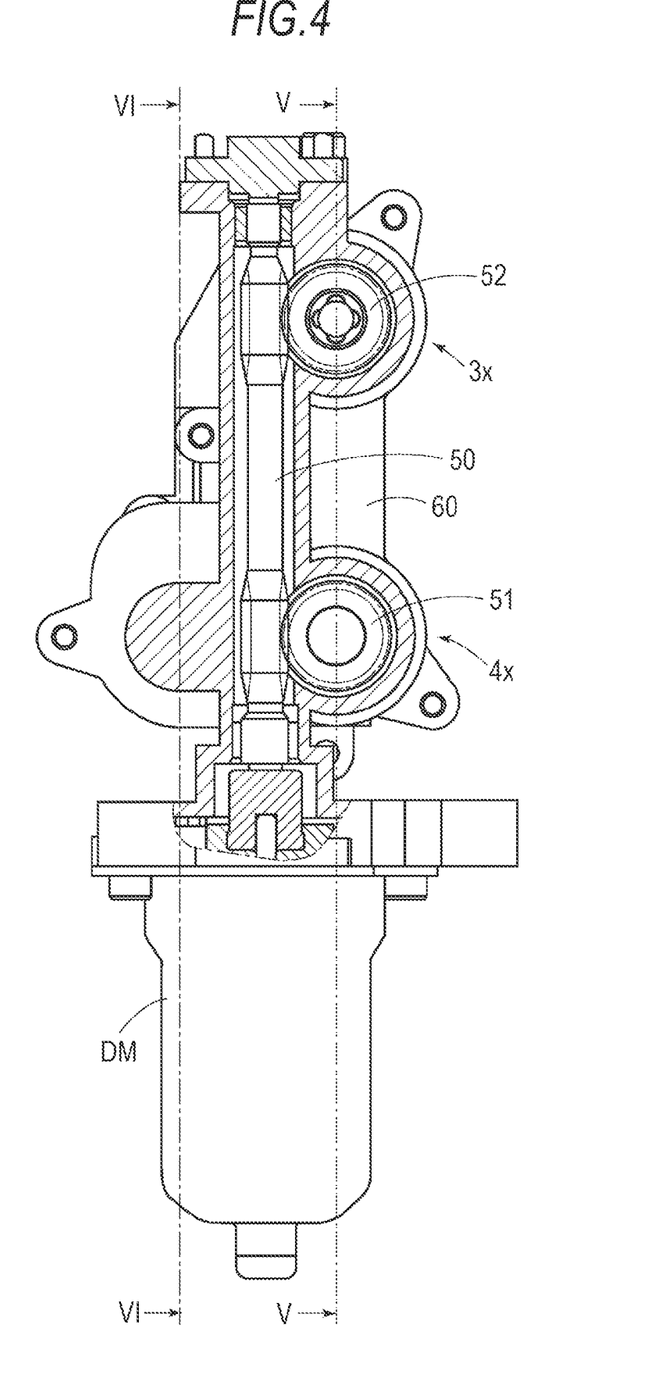
FIG. 4 is a cross-sectional view taken along line IV-IV in FIG. 3 illustrating the enlarged driving mechanism portion in the embodiment disclosed here.
Figure 5:
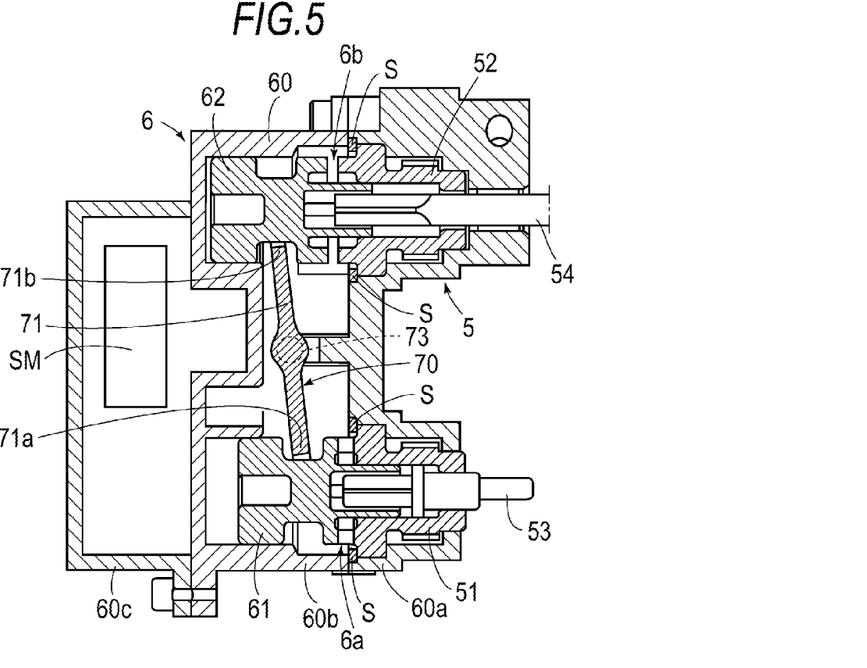
FIG. 5 is a cross-sectional view taken along line V-V in FIG. 4 illustrating the enlarged switching mechanism portion in a state where a driving mechanism is switched to a tilt mechanism side in the embodiment disclosed here.

The driving switching unit U accommodates a driving mechanism 5 and a switching mechanism 6 which selectively drive the telescopic mechanism 3 and the tilt mechanism 4, and the driving mechanism 5 and the switching mechanism 6 are configured as illustrated in FIGS. 3 to 10. First, as illustrated in FIGS. 1 and 3, the driving motor DM is disposed at a bottom of the steering column 2, and each of a tilt output portion 3x and a telescopic output portion 4x is provided on one side of a direction orthogonal to an output shaft of the driving motor DM. A first clutch mechanism 6a and a second clutch mechanism 6b are configured as follows: as illustrated in FIG. 4, a first worm wheel 51 and a second worm wheel 52 are rotatably supported in a housing 60 of the driving switching unit U in such a manner that the first worm wheel 51 and the second worm wheel 52 mesh with a worm shaft 50 of the driving motor DM, and as illustrated in FIG. 5, the first worm wheel 51 and the second worm wheel 52 are respectively disposed to be connectable and disconnectable with respect to a first clutch member 61 and a second clutch member 62. The first clutch member 61 (and the second clutch member 62) has a drum shape. A toothed portion of a tooth clutch is formed on one end surface in an axial direction of the first clutch member 61, a toothed portion of the tooth clutch is also formed on one end surface of the first worm wheel 51 (and the second worm wheel 52), and the first clutch member 61 and the second clutch member 62 are disposed in such a manner that both toothed portions can mesh with each other. The first worm wheel 51 (or the second worm wheel 52) is disconnected from or connected to the first clutch member 61 (or the second clutch member 62) based on a relationship between relative positions thereof.

In FIG. 5, the first clutch member 61 is connected to a connection member 53 via an interlocking mechanism (for example, a cross-shaped coupling member) in such a manner that the first clutch member 61 is slidable and rotatable integrally with the connection member 53. Furthermore, as illustrated in FIG. 1, the connection member 53 is connected to the tilt screw shaft 43 via a universal joint 46. The second clutch member 62 is also connected to a connection member 54 via an interlocking mechanism (for example, a cross-shaped coupling member) in such a manner that the second clutch member 62 is slidable and rotatable integrally with the connection member 54. Furthermore, the connection member 54 is (directly) screw-coupled with the telescopic screw shaft 33. The first worm wheel 51 and the second worm wheel 52 are supported by the housing 60 in such a manner that the first worm wheel 51 and the second worm wheel 52 are respectively rotatable with respect to the connection members 53 and 54. The first clutch member 61 and the second clutch member 62 are respectively connected to the tilt screw shaft 43 and the telescopic screw shaft 33 to rotate integrally therewith. The first clutch member 61 and the second clutch member 62 are respectively disposed to be engageable and disengageable with respect to the first worm wheel 51 and the second worm wheel 52. A spline coupling may be used as the interlocking mechanism that connects the first clutch member 61 and the second clutch member 62 respectively to the connection members 53 and 54. A structure of connecting the telescopic screw shaft 33 and the tilt screw shaft 43 to the connection members 53 and 54 is acceptable insofar as the connection structure can transmit a rotational torque. The connection structure may be a flexible coupling via a universal joint, a torque cable or the like in addition to a fixed coupling by a screw or the like.

Figure 7:
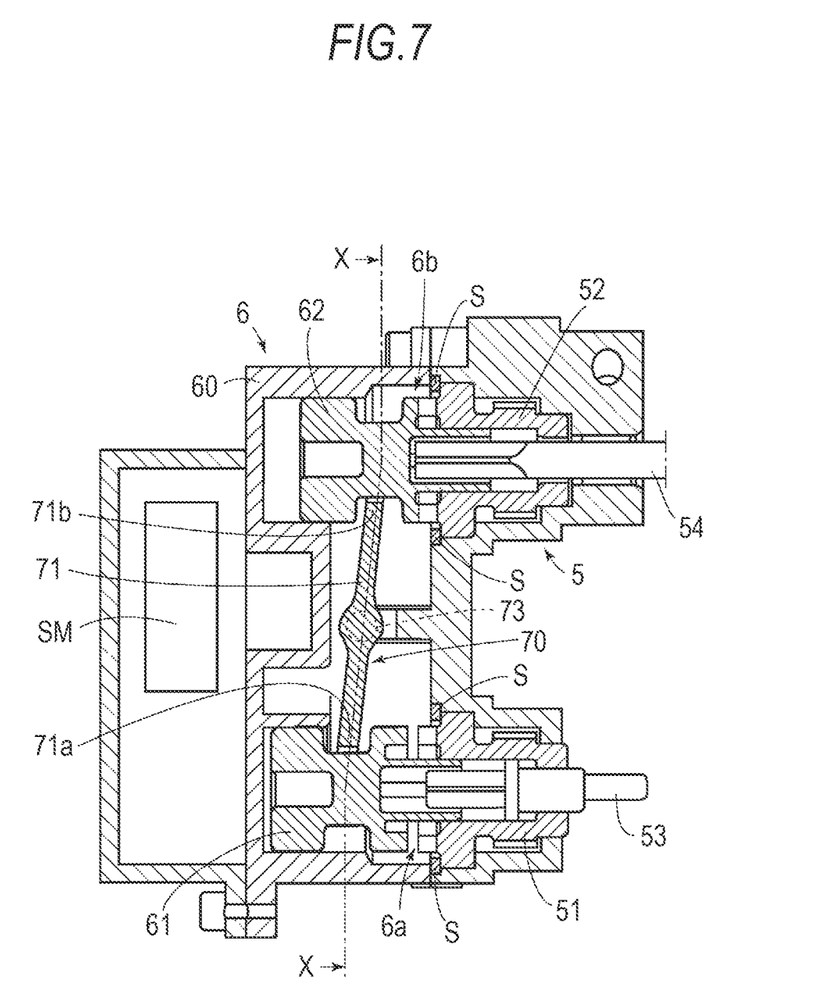
FIG. 7 is a cross-sectional view taken along line V-V in FIG. 4 illustrating the enlarged switching mechanism portion in a state where the driving mechanism is switched to a telescopic mechanism side in the embodiment disclosed here.

As discussed above, a speed reduction mechanism of the telescopic screw shaft 33 is configured to have the worm shaft 50 of the driving motor DM and the worm wheel 52, and a speed reduction mechanism of the tilt screw shaft 43 is configured to have the worm shaft 50 of the driving motor DM and the worm wheel 51. An output torque of the driving motor DM is appropriately adjusted and transmitted to the telescopic mechanism 3 and the tilt mechanism 4 via the speed reduction mechanism. As illustrated in FIG. 5, when the first clutch member 61 moves in the axial direction (in a right direction in FIG. 5) and meshes with the first worm wheel 51, the worm shaft 50 and the tilt screw shaft 43 are connected to each other via the first worm wheel 51, the first clutch member 61, the connection member 53 and the universal joint 46, and the tilt mechanism 4 is driven by the driving motor DM. At this time, the second clutch member 62 is disconnected from the second worm wheel 52, and the second worm wheel 52 idles. In contrast, as illustrated in FIG. 7, when the second clutch member 62 moves in an axial direction (in a right direction in FIG. 7) and meshes with the second worm wheel 52, the worm shaft 50 and the telescopic screw shaft 33 are connected to each other via the second worm wheel 52, the second clutch member 62 and the connection member 54, and the telescopic mechanism 3 is driven by the driving motor DM. At this time, the first clutch member 61 is disconnected from the first worm wheel 51, and the first worm wheel 51 idles.

In the embodiment, as illustrated in FIGS. 5 to 8, a lever member 70 is used as a switching mechanism of the first clutch mechanism 6a and the second clutch mechanism 6b, and the lever member 70 is tiltably supported in the driving switching unit U. The lever member 70 has a lever portion 71 and an arm portion 72. The lever portion 71 is shaft-supported by a housing 60b via a shaft portion 73 provided at a center portion of the lever portion 71. One end portion 71a of the lever portion 71 engages with the first clutch member 61, and the other end portion 71b engages with the second clutch member 62. The arm portion 72 extends from the lever portion 71 to be in parallel with either one end portion or the other end portion (in one end portion 71a in the embodiment). As illustrated by an unhatching portion in FIG. 10, the lever member 70 is formed to have an h shape in a top view. Both end portions (71a and 71b) of the lever portion 71 is formed to have a U shape in the top view, and each of the end portions (71a and 71b) is configured to engage with diameter-reduction portions of the drum-shaped first clutch member 61 and the drum-shaped second clutch member 62, respectively.

Figure 6:
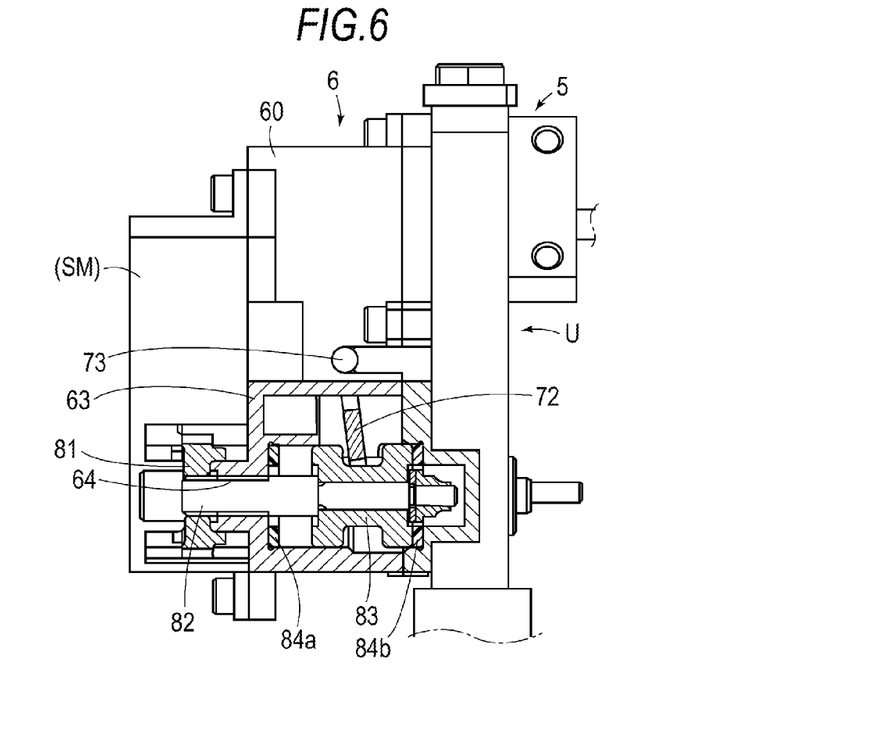
FIG. 6 is a cross-sectional view taken along line VI-VI in FIG. 4 illustrating the enlarged switching mechanism portion in a state where the driving mechanism is switched to the tilt mechanism side in the embodiment disclosed here.
Figure 8:
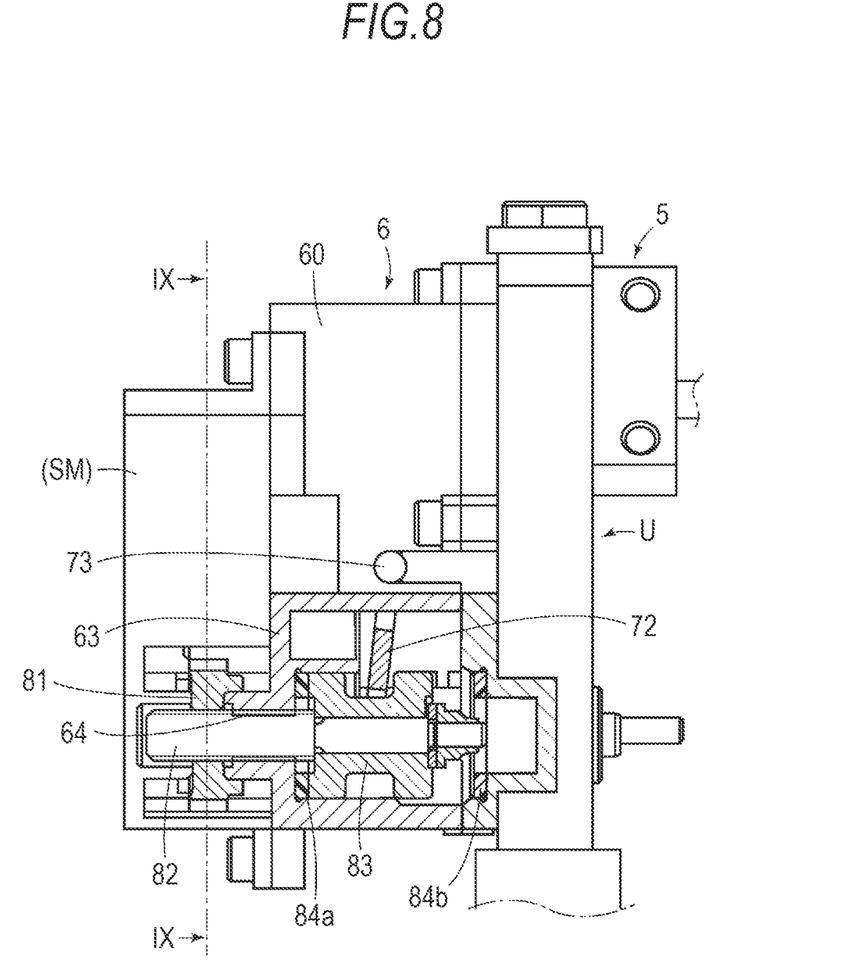
FIG. 8 is a cross-sectional view taken along line VI-VI in FIG. 4 illustrating the enlarged switching mechanism portion in a state where the driving mechanism is switched to the telescopic mechanism side in the embodiment disclosed here.
Figure 9:
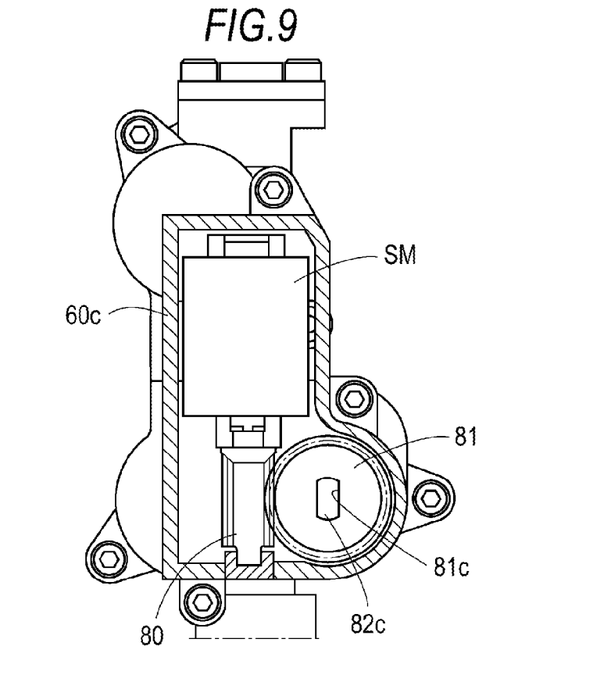
FIG. 9 is a cross-sectional view taken along line IX-IX in FIG. 8 illustrating the switching mechanism portion in the embodiment disclosed here.
Figure 10:
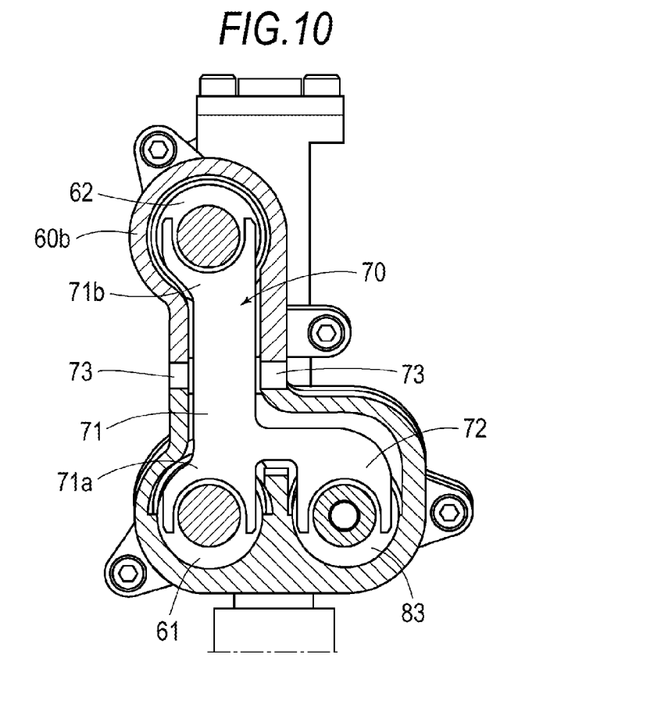
FIG. 10 is a cross-sectional view taken along line X-X in FIG. 7 illustrating the switching mechanism portion in the embodiment disclosed here.

The housing 60 of the driving switching unit U is provided with a case 63 that has a screw hole 64 at a position which faces the arm portion 72 of the lever member 70. A drum-shaped slider 83 is supported by a screw shaft 82 that is screwed into the screw hole 64, and is connected to a switching motor SM. The switching motor SM is provided in the housing 60 (a member 60c illustrated in FIGS. 5 and 9), and as illustrated in FIG. 9, a speed reduction mechanism is configured in such a manner that a worm shaft 80 integrated with an output shaft of the switching motor SM is screwed on a worm wheel 81. A substantially rectangular (a so-called width across flat) guide hole 81c is formed in a center portion of the worm wheel 81, a guide portion 82c formed in a tip end portion of the screw shaft 82 is fitted into the guide hole 81c and thus, the screw shaft 82 is supported to be movable in an axial direction. Accordingly, when the switching motor SM is rotationally driven, rotation of the switching motor SM is reduced via the worm shaft 80 and the worm wheel 81, and the screw shaft 82 is rotationally driven with respect to the screw hole 64 by rotational driving of the worm wheel 81. At this time, as illustrated in FIGS. 6 and 8, since the screw shaft 82 (the guide portion 82c) is supported to be movable in the axial direction with respect to the worm wheel 81 (the guide hole 81c), the screw shaft 82 moves in the axial direction, and the screw shaft 82 and the slider 83 move in the axial direction. As illustrated in FIG. 10, a tip end portion of the arm portion 72 is formed to have a U shape in the top view similar to both end portions (71a and 71b) of the lever portion 71, and the tip end portion of the arm portion 72 is configured to engage with a diameter-reduction portion of the slider 83.

When the arm portion 72 engages with the slider 83, and the slider 83 is driven in the axial direction based on rotation of the screw shaft 82 by rotational driving of the switching motor SM, the lever member 70 tilts about the shaft portion 73, one of the first clutch member 61 and the second clutch member 62 moves in a predetermined direction, and the other moves in a direction opposite to the predetermined direction. In this configuration, it is possible to easily and reliably put one of the first clutch mechanism 6a and the second clutch mechanism 6b in a connection state and the other in a disconnection state. It is possible to reliably maintain this connection state without applying a load caused by an external force to the lever member 70. Accordingly, it is possible to adopt the small switching motor SM, and easily provide the switching motor SM in the driving switching unit U.

Furthermore, as illustrated in FIGS. 5 and 7, the housing 60 is provided with annular and plate-shaped metal shims (representatively indicated by S) as locking members that restrain the first worm wheel 51 and the second worm wheel 52 from respectively moving toward the first clutch member 61 and the second clutch member 62. Since the shim S is interposed between two members (60*a* and 60*b*) among three members (60*a*, 60*b* and 60*c*) of the housing 60 illustrated in FIG. 5, and an entire circumference of the shim S can receive a reaction force of each of the first worm wheel 51 and the second worm wheel 52, it is possible to ensure smooth rotation of each of the first worm wheel 51 and the second worm wheel 52. As illustrated in FIGS. 6 and 8, annular plates 84*a* and 84*b* made of resin, rubber or the like are disposed on both sides of an allowable axial movement range of the slider 83 as cushioning members. When the slider 83 comes into contact with the cushioning member, the slider 83 is prevented from moving in the axial direction and thus, the screw shaft 82 can be prevented from being jammed.

The switching motor SM and the driving motor DM are configured to be rotationally driven in a sequence based on an operation of a switch (not illustrated) through which an operation mode is switched between the tilt operation mode and the telescopic operation mode. That is, the switching motor SM and the driving motor DM are configured as follows: when a driver operates the switch in such a manner that either the tilt operation mode or the telescopic operation mode is enabled, first, the switching motor SM is rotationally driven to adjust an operation mode to either the tilt operation mode or the telescopic operation mode, and after the switching motor SM stops, the driving motor DM is rotationally driven to set a position of the steering wheel W to either a desired tilt position or a desired telescopic position, and when the driver stops the operation of the switch, the driving motor DM stops. Accordingly, when the driving motor DM stops, the steering wheel W is retained at an adjustment position of the telescopic mechanism 3 or the tilt mechanism 4.

Hereinafter, an entire operation of the steering apparatus with this configuration will be described. When the tilt operation is performed, the slider 83 moves in the axial direction (in a right direction in FIG. 6) based on rotational driving of the switching motor SM by a driver's operation of the switch. Accordingly, the lever member 70 tilts (in a counter-clockwise direction in FIG. 5), and the first clutch member 61 is meshedly connected to the first worm wheel 51. At this time, since the second worm wheel 52 is disconnected from the second clutch member 62, the second worm wheel 52 idles, and a rotational torque of the worm shaft 50 is not transmitted to the second worm wheel 52. In contrast, when the telescopic operation is performed, the slider 83 moves in the axial direction (in a left direction in FIG. 8) based on rotational driving (in a direction opposite to the direction of the rotational driving described above) of the switching motor SM by a driver's operation of the switch. Accordingly, the lever member 70 tilts (in a clockwise direction in FIG. 7), and the second clutch member 62 is meshedly connected to the second worm wheel 52. At this time, since the first worm wheel 51 is disconnected from the first clutch member 61, the first worm wheel 51 idles, and a rotational torque of the worm shaft 50 is not transmitted to the first worm wheel 51.

When the slider 83 is in the state illustrated in FIG. 6, and as illustrated in FIG. 5, the driving motor DM is driven in a state where the first worm wheel 51 is connected to the tilt mechanism 4 via the first clutch member 61, an output torque of the driving motor DM is adjusted via the worm shaft 50 and the first worm wheel 51 to drive the tilt mechanism 4, and when the driving motor DM stops, the steering wheel W is retained at a desired vertical operation position (at a tilt position). In contrast, when the slider 83 is in the state illustrated in FIG. 8 by the switching motor SM, and the second clutch member 62 meshes with the second worm wheel 52 due to the tilting of the lever member 70, the first clutch member 61 is disconnected from the first worm wheel 51, and an operation mode is switched to the telescopic mechanism 3. In this state, when the driving motor DM is driven, an output torque of the driving motor DM is adjusted via the worm shaft 50 and the second worm wheel 52 to drive the telescopic mechanism 3, and when the driving motor DM stops, the steering wheel W is retained at a desired operation position (at a telescopic position) in the front and rear direction.

An aspect of this disclosure is directed to a vehicle steering apparatus including: a telescopic mechanism that can move a steering column in a front and rear direction of a vehicle; a tilt mechanism that can tilt the steering column in a vertical direction of the vehicle; driving mechanism that adjusts and transmits an output torque of a driving motor to a telescopic screw shaft that drives the telescopic mechanism and to a tilt screw shaft that drives the tilt mechanism provided in parallel with the telescopic screw shaft; and a switching mechanism that has a first clutch mechanism which connects and disconnects the driving mechanism and the tilt screw shaft, a second clutch mechanism which connects and disconnects the driving mechanism and the telescopic screw shaft, and a switching motor that switches a clutch mechanism between the first clutch mechanism and the second clutch mechanism, wherein the first clutch mechanism and the second clutch mechanism of the switching mechanism has a first clutch member and a second clutch member, respectively, which mutually move in an axial direction and transmit a rotational force when either the tilt screw shaft or the telescopic screw shaft is connected to the driving mechanism, and when the switching motor moves one of the first clutch member and the second clutch member in a predetermined direction, one of the first clutch mechanism and the second clutch mechanism is put in a connection state, the other of the first clutch member and the second clutch member moves in a direction opposite to the predetermined direction, and the other of the first clutch mechanism and the second clutch mechanism is put in a disconnection state.

It is preferable that, in the steering apparatus, a single driving switching unit is configured to have the switching mechanism and the driving mechanism. It is preferable that the switching mechanism is configured to include a lever portion, a center portion of which is shaft-supported in the driving switching unit, and which has one end portion engaging with the first clutch member and the other end portion engaging with the second clutch member; a lever member that has an arm portion which extends from the lever portion to be in parallel with either one end portion or the other end portion; a case that is retained in the driving switching unit and has a screw hole at a position which faces the arm portion of the lever member; a screw shaft that is screwed into the screw hole of the case, and is connected to the switching motor to rotate based on rotational driving of the switching motor; and a slider that is supported by the screw shaft to move in an axial direction based on rotation of the screw shaft with respect to the screw hole of the case, and the switching mechanism is configured to engage the arm portion of the lever member with the slider, to drive the slider in the axial direction based on the rotational driving of the screw shaft by the switching motor, to tilt the lever member, to move one of the first clutch member and the second clutch member in the predetermined direction, and to move the other of the first clutch member and the second clutch member in the direction opposite to the predetermined direction.

It is preferable that the steering apparatus has a configuration in which a cushioning member is disposed on each side of an allowable axial movement range of the slider, and when the slider comes into contact with the cushioning member, the slider is prevented from moving in the axial direction.

It is preferable that, in the steering apparatus, the driving mechanism is configured to have a worm shaft that is connected to an output shaft of the driving motor, a first worm wheel that is screwed on the worm shaft and the tilt screw shaft, and a second worm wheel that is screwed on the worm shaft and the telescopic screw shaft, and the steering apparatus has a configuration in which the first clutch member and the second clutch member are respectively connected to the tilt screw shaft and the telescopic screw shaft to rotate integrally therewith, and are respectively disposed to be engageable and disengageable with respect to the first worm wheel and the second worm wheel.

Furthermore, it is preferable that the steering apparatus has a configuration in which a housing of the driving switching unit is provided with a locking member that restrains the first worm wheel and the second worm wheel from respectively moving toward the first clutch member and the second clutch member.

The configuration disclosed here provides the following effects. That is, the steering apparatus disclosed here includes the driving mechanism that adjusts and transmits an output torque of the driving motor to the telescopic screw shaft which drives the telescopic mechanism and to the tilt screw shaft which drives the tilt mechanism provided in parallel with the telescopic screw shaft; and the switching mechanism that has the first clutch mechanism which connects and disconnects the driving mechanism and the tilt screw shaft, the second clutch mechanism which connects and disconnects the driving mechanism and the telescopic screw shaft, and a switching motor that puts one of the first clutch mechanism and the second clutch mechanism in a connection state and the other in a disconnection state. It is possible to easily and reliably put one of the first clutch mechanism and the second clutch mechanism in the connection state and the other in the disconnection state. It is possible to selectively connect the single driving motor to either the telescopic mechanism or the tilt mechanism. Since the telescopic screw shaft and the tilt screw shaft are provided in parallel with each other, it is possible to configure the entire apparatus in a compact size.

In particular, when the single driving switching unit is configured to have the switching mechanism and the driving mechanism, the telescopic screw shaft, the tilt screw shaft or the like can be communized with those of the telescopic mechanism and the tilt mechanism of the related art except for the driving switching unit and thus, costs can be reduced. Furthermore, when the switching mechanism is configured to include the lever member that has the lever portion and the arm portion; the case that has the screw hole at a position which faces the arm portion; the screw shaft that is screwed into the screw hole and is connected to the switching motor; and the slider that is supported by the screw shaft to move in the axial direction based on the rotation of the screw shaft with respect to the screw hole of the case, and the arm portion is connected to the slider, it is possible to reliably maintain this connection state without applying a load caused by an external force to the lever member. Accordingly, it is possible to adopt the small switching motor, and configure the entire apparatus in a compact size.

In the steering apparatus, when the cushioning member is disposed on each side of the allowable axial movement range of the slider, the slider can be appropriately prevented from moving in the axial direction, and a smooth operation of the slider can be ensured. Furthermore, when the housing of the driving switching unit is provided with the locking member, movement of the first and the second worm wheels can be appropriately restrained, and smooth rotation of the first and the second worm wheels can be ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle steering apparatus comprising:
   a telescopic mechanism that can move a steering column in a front and rear direction of a vehicle;
   a tilt mechanism that can tilt the steering column in a vertical direction of the vehicle;
   a driving mechanism that adjusts and transmits an output torque of a driving motor to a telescopic screw shaft that drives the telescopic mechanism and to a tilt screw shaft that drives the tilt mechanism provided in parallel with the telescopic screw shaft;
   a switching mechanism that has a first clutch mechanism which connects and disconnects the driving mechanism and the tilt screw shaft, a second clutch mechanism which connects and disconnects the driving mechanism and the telescopic screw shaft, and a switching motor that switches between the first clutch mechanism and the second clutch mechanism;
   wherein the first clutch mechanism and the second clutch mechanism of the switching mechanism has a first clutch member and a second clutch member, respectively, which mutually move in an axial direction and transmit a rotational force when either the tilt screw shaft or the telescopic screw shaft is connected to the driving mechanism, and when the switching motor moves one of the first clutch member and the second clutch member in a predetermined direction, one of the first clutch mechanism and the second clutch mechanism is put in a connection state, the other of the first clutch member and the second clutch member moves in a direction opposite to the predetermined direction, and the other of the first clutch mechanism and the second clutch mechanism is put in a disconnection state;
   wherein a single driving switching unit is configured to have the switching mechanism and the driving mechanism; and
   wherein the switching mechanism includes:
      a lever portion, a center portion of which is shaft-supported in the driving switching unit, and which has one end portion engaging with the first clutch member and the other end portion engaging with the second clutch member;

a lever member that has an arm portion which extends from the lever portion to be in parallel with either one end portion or the other end portion;

a case that is retained in the driving switching unit and has a screw hole at a position which faces the arm portion of the lever member;

a screw shaft that is screwed into the screw hole of the case, and is connected to the switching motor to rotate based on rotational driving of the switching motor; and a slider that is supported by the screw shaft to move in an axial direction based on rotation of the screw shaft with respect to the screw hole of the case, and wherein the switching mechanism engages the arm portion of the lever member with the slider, drives the slider in the axial direction based on the rotational driving of the screw shaft by the switching motor, tilts the lever member, moves one of the first clutch member and the second clutch member in the predetermined direction, and moves the other of the first clutch member and the second clutch member in the direction opposite to the predetermined direction.

2. The vehicle steering apparatus according to claim 1, wherein a cushioning member is disposed on each side of an allowable axial movement range of the slider, and when the slider comes into contact with the cushioning member, the slider is prevented from moving in the axial direction.

3. The vehicle steering apparatus according to claim 1, wherein the driving mechanism includes:

a worm shaft that is connected to an output shaft of the driving motor;

a first worm wheel that is screwed on the worm shaft and the tilt screw shaft; and a second worm wheel that is screwed on the worm shaft and the telescopic screw shaft, and wherein the first clutch member and the second clutch member are respectively connected to the tilt screw shaft and the telescopic screw shaft to rotate integrally therewith, and are respectively disposed to be engageable and disengageable with respect to the first worm wheel and the second worm wheel.

4. The vehicle steering apparatus according to claim 3, wherein a housing of the driving switching unit is provided with a locking member that restrains the first worm wheel and the second worm wheel from respectively moving toward the first clutch member and the second clutch member.

* * * * *